Nov. 30, 1926. 1,608,611
L. C. MILBURN
ADJUSTABLE AIRPLANE RUDDER PEDAL
Filed April 28, 1926 2 Sheets-Sheet 1

INVENTOR
Lessiter C. Milburn,
BY
ATTORNEY.

Nov. 30, 1926.  
L. C. MILBURN  
1,608,611  
ADJUSTABLE AIRPLANE RUDDER PEDAL  
Filed April 28, 1926    2 Sheets-Sheet 2
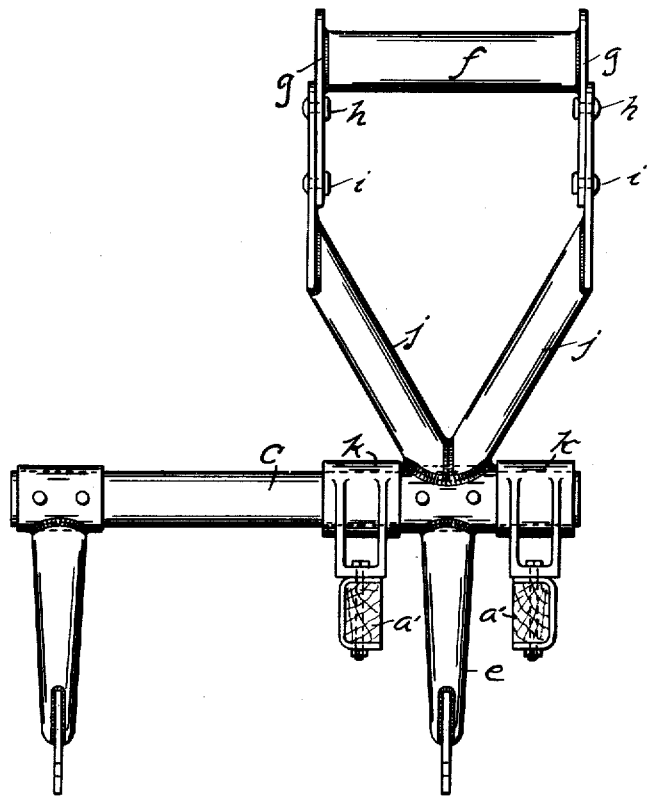
Fig. 4
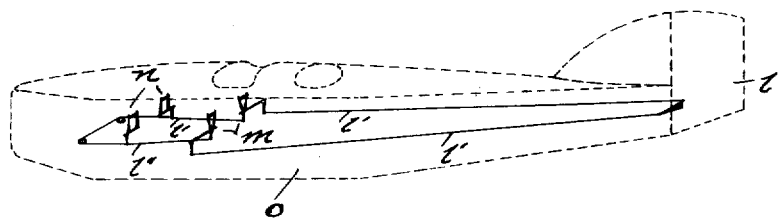
Fig. 5
INVENTOR  
Lessiter C. Milburn,  
BY  
ATTORNEY.

Patented Nov. 30, 1926.

1,608,611

UNITED STATES PATENT OFFICE.

LESSITER C. MILBURN, OF CLEVELAND, OHIO, ASSIGNOR TO THE GLENN L. MARTIN COMPANY, OF CLEVELAND, OHIO, A CORPORATION OF OHIO.

ADJUSTABLE AIRPLANE RUDDER PEDAL.

Application filed April 28, 1926. Serial No. 105,112.

My invention relates to improvements in adjustable airplane rudder pedal, and has for its object the provision of means for readily altering the operative position of the pedal members in an airplane, to accommodate pilots of different stature or reach, and incidentally vary their range of leverage.

This object is furthered in the construction of a pedal that will require no tools for changing its adjustment, while permitting of the positive locking of the pedal member in any of its adjusted positions.

Further objects that I have had in view are the provision of an extremely simple construction and one that will not loosen or come apart through failure to tighten fastening nuts or the like.

Accordingly, I have provided a pedal construction adapted for the conditions of continuous use in changing the position and controlling an airplane rudder bar, in accordance with the varying requirements of flight. The typical embodiment of my invention contemplates the provision of an adjusting plate or adjusting plates, in association with the pedal member engaged by the foot of the pilot and mounting the same upon a lever arm or lever arms. This plate is suitably slotted with two coacting sets of adjusting and locking slots, whereby the pedal member may be adjusted readily by hand and locked in its various operative positions without chance for its accidential slipping or displacement during flight.

The features of my instant improvement and the advantages thereof may best be explained by making reference to the accompanying drawings illustrating preferred embodiments of the invention, wherein:

Fig. 4 is another view in elevation of a slightly modified mounting for the pedal member, and Fig. 5 is a diagrammatic view of the fuselage and rudder of an airplane, shown in dotted lines, together with the control wires and pedals for operating the rudder from two positions.

Throughout the several figures of the drawings I have employed the same character of reference to indicate similar parts.

Figures 1, 2, 3:
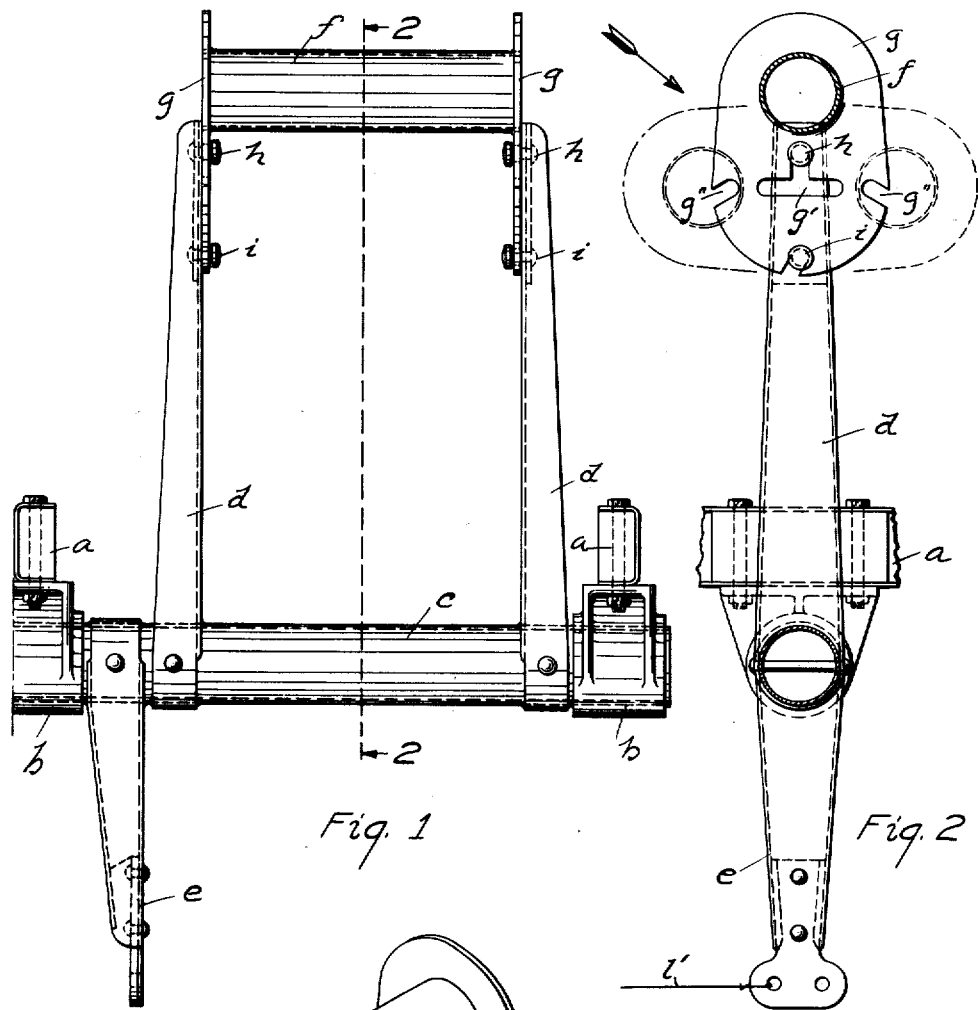
Figure 1 is a view in rear elevation of a rudder pedal and its pivot shaft as mounted for the control of the rudder.
Fig. 2 is a section taken on line 2—2 of Fig. 1, viewed in the direction of the arrows.
Fig. 3 is a perspective view of a pedal member and its slotted mounting plates.

In the construction shown on sheet 1 of the drawings, the pedal member is mounted upon its pedal shaft by means of two lever arms bridged thereby, while the modified form employs a bifurcated lever connected to the pivot shaft immediately above the controlling lever. Other structural details are varied, as well, but the identical type of adjustment, best shown in Figs. 2 and 3, is associated with both forms.

The pivot shaft, Fig. 1, mounted between the bearings $b$, is bolted to the supports $a$, $a$, of the fuselage. Said shaft $c$ is provided with two lever arms $d$, $d$, between which the pedal member of Fig. 3 is adjustably mounted, while a controlling lever $e$, connected by a control wire with the rudder, is oppositely positioned upon said shaft.

The pedal member comprises the tubular cross piece $f$ welded between the terminal adjusting plates $g$. These plates are provided with T-shaped adjusting slots $g'$ and three locking slots $g''$ at inclinations and corresponding to the three arms of the T-shaped slot.

These two sets of coacting slots, which are duplicated in both of the mounting plates, are provided with corresponding studs $h$, $i$, having enlarged heads to accommodate the thickness of the mounting plate, and respectively riveted to the lever arms $d$, $d$, so that the mounting plates have free pivotal movement therebetween as indicated by the dotted line positions, Fig. 2. Referring to this figure, it will be seen that with foot pressure applied substantially in the direction of the arrow, the lever length not only is effectively altered, but the leg length of the pilot is accommodated to suit conditions. The inclined locking slots, it will be observed, are so positioned that the pedal member is held against displacement by any pressure applied in the direction indicated, while the heads and the studs serve to hold the mounting plates rigidly between the lever arms.

A slightly modified embodiment is illustrated in Fig. 4 wherein the lever arms *j*, *j*, and the controlling lever *e* are welded upon the pivot shaft *c*, substantially in the form of a Y. The bearings *k*, *k*, are more closely positioned in this type, between which the pedal member of Fig. 3, just above described, is adjustably mounted to apply controlling pressure immediately above or in line with the controlling lever. The features of adjustment do not require additional description, since they are the same as set forth above.

The showing of Fig. 5 by diagram, indicates the connection of the rudder 1 by means of control wires *l'*, *l''*, with the two sets of adjustable rudder pedals *m* and *n*, provided at two operative positions within the fuselage *o*. From the above, it will be understood that these pedals may be readily adjusted from time to time by the pilots to suit their requirements and afford some measure of change and rest in guiding the airplane.

Having now described the preferred embodiment of my invention, I claim as new and desire to secure by Letters Patent, together with such modifications as may be made by one ordinarily skilled in the art, the following:

1. In an appliance of the class described, the combination with a pivoted operating lever, of an associated pedal member, and a mounting therefor upon said operating lever, comprising two spaced studs and a co-acting adjustable plate provided with a plurality of spaced positioning slots and corresponding locking slots for alternatively engaging said studs, whereby the operative position of the pedal member may be adjusted, substantially as set forth.

2. In an appliance of the class described, the combination with paired operating lever arms, of an associated pedal member positioned therebetween, and a mounting for said member upon the lever arms, comprising two spaced studs upon each arm and corresponding adjusting plates for the pedal member, each provided with a plurality of corresponding spaced positioning slots and locking slots for alternatively engaging said studs in different positions, whereby the operative position of the pedal member may be adjusted and locked, substantially as set forth.

3. In an adjustable airplane rudder pedal, the combination with the rotatable shaft adapted for connection with the rudder, of an operating lever mounted thereon having two lever arms, a pedal member associated therewith, and an adjustable mounting for said member upon the operating lever, comprising two spaced studs upon each lever arm and terminal adjusting plates for said member, each provided with a plurality of spaced positioning slots and corresponding locking slots for alternatively engaging the respective studs, whereby the operative position of the pedal member may be adjusted and locked, substantially as set forth.

In testimony whereof I do now affix my signature.

LESSITER C. MILBURN.